US012667042B2

(12) United States Patent　　(10) Patent No.:　US 12,667,042 B2

Hodel et al.　　(45) Date of Patent:　Jun. 30, 2026

(54) APPARATUSES FOR SOIL AND SEED MONITORING

(71) Applicant: Precision Planting LLC, Tremont, IL (US)

(72) Inventors: Jeremy J. Hodel, Morton, IL (US); Michael Strnad, Delavan, IL (US)

(73) Assignee: Precision Planting LLC, Tremont, IL (US)

( * ) Notice: Subject to any disclaimer, the term of this patent is extended or adjusted under 35 U.S.C. 154(b) by 766 days.

(21) Appl. No.: 17/758,730

(22) PCT Filed: Sep. 28, 2020

(86) PCT No.: PCT/IB2020/059047

§ 371 (c)(1),
(2) Date: Jul. 13, 2022

(87) PCT Pub. No.: WO2021/144629

PCT Pub. Date: Jul. 22, 2021

(65) Prior Publication Data

US 2023/0059032 A1　　Feb. 23, 2023

Related U.S. Application Data

(60) Provisional application No. 62/962,795, filed on Jan. 17, 2020.

(51) Int. Cl.
| | |
|---|---|
| *A01C 5/06* | (2006.01) |
| *A01C 7/10* | (2006.01) |
| *A01C 7/20* | (2006.01) |

(52) U.S. Cl.
CPC .............. *A01C 5/062* (2013.01); *A01C 7/205* (2013.01); *A01C 7/102* (2013.01)

(58) Field of Classification Search
CPC ........... A01C 7/205; A01C 7/201; A01C 5/06; A01C 7/102; A01B 79/005
See application file for complete search history.

(56) References Cited

U.S. PATENT DOCUMENTS

| | | | | | |
|---|---|---|---|---|---|
| 4,414,903 | A | * | 11/1983 | Fasse ................... | A01B 69/008 |
| | | | | | 172/126 |
| 5,040,613 | A | * | 8/1991 | Dodd ..................... | A01B 13/06 |
| | | | | | 180/401 |

(Continued)

FOREIGN PATENT DOCUMENTS

| | | |
|---|---|---|
| DE | 102006008331 A1 | 8/2007 |
| EP | 0776598 A1 | 6/1997 |

(Continued)

OTHER PUBLICATIONS

South Africa Intellectual Property Office, Search Report related to ZA2022/07105, completion date Jul. 16, 2024, 2 pages.

(Continued)

*Primary Examiner* — Joseph M Rocca
*Assistant Examiner* — Julia C Tran

(57) ABSTRACT

In one embodiment, a soil apparatus includes a soil engaging portion to engage with soil and a plurality of sensors disposed in the soil apparatus and having a pivotable axis within the soil apparatus. Each sensor is independently pivotable about the pivotable axis to independently position for sensing soil characteristics of soil.

9 Claims, 14 Drawing Sheets

(56)  References Cited

U.S. PATENT DOCUMENTS

| | | | |
|---|---|---|---|
| 5,044,756 | A | 9/1991 | Gaultney et al. |
| 6,553,925 | B1 | 4/2003 | Beaujot |
| 6,608,672 | B1 | 8/2003 | Shibusawa et al. |
| 6,937,939 | B1 | 8/2005 | Shibusawa et al. |
| 9,265,192 | B2 * | 2/2016 | Chan .................... A01G 25/167 |
| 9,585,301 | B1 | 3/2017 | Lund et al. |
| 9,864,094 | B2 | 1/2018 | Stoller et al. |
| 10,219,421 | B2 | 3/2019 | Achen et al. |
| 10,481,142 | B2 | 11/2019 | Rhodes et al. |
| 10,820,508 | B2 * | 11/2020 | Dix ...................... G05D 1/0278 |
| 11,497,154 | B1 * | 11/2022 | Lund .................... A01B 63/002 |
| 11,622,496 | B2 * | 4/2023 | Kowalchuk ............ A01C 7/102 |
| | | | 111/163 |
| 2002/0131046 | A1 | 9/2002 | Christy et al. |
| 2003/0016029 | A1 | 1/2003 | Schuler et al. |
| 2012/0042813 | A1 * | 2/2012 | Liu ........................ A01C 7/105 |
| | | | 111/149 |
| 2013/0112122 | A1 * | 5/2013 | Blomme ................ A01C 7/105 |
| | | | 111/149 |
| 2014/0297242 | A1 | 10/2014 | Sauder et al. |
| 2015/0094917 | A1 | 4/2015 | Blomme et al. |
| 2016/0037709 | A1 | 2/2016 | Sauder et al. |
| 2016/0157411 | A1 | 6/2016 | Lysaght |
| 2017/0067869 | A1 | 3/2017 | Lund et al. |
| 2017/0339819 | A1 | 11/2017 | Kowalchuk et al. |
| 2018/0125002 | A1 * | 5/2018 | Stoller ................... A01C 7/201 |
| 2018/0184581 | A1 * | 7/2018 | Morgan .............. G01N 21/359 |

FOREIGN PATENT DOCUMENTS

| | | | |
|---|---|---|---|
| EP | 3150045 | A1 | 4/2017 |
| EP | 3415897 | A1 | 12/2018 |
| WO | 2016/205424 | A1 | 12/2016 |
| WO | 2016205422 | A1 | 12/2016 |
| WO | 2017/197274 | A1 | 11/2017 |
| WO | WO-2018018050 | A1 * | 1/2018 ............. A01C 7/203 |
| WO | 2019099748 | A1 | 5/2019 |

OTHER PUBLICATIONS

South Africa Intellectual Property Office, Written Opinion related to ZA2022/07105, completion date Jul. 16, 2024, 6 pages.

UK Intellectual Property Office, Search report for related UK Application No. GB2001452.8, dated Jul. 31, 2020.

European Patent Office, International Search Report for related International Patent Application No. PCT/IB2020/059047, mail date Feb. 10, 2021.

* cited by examiner

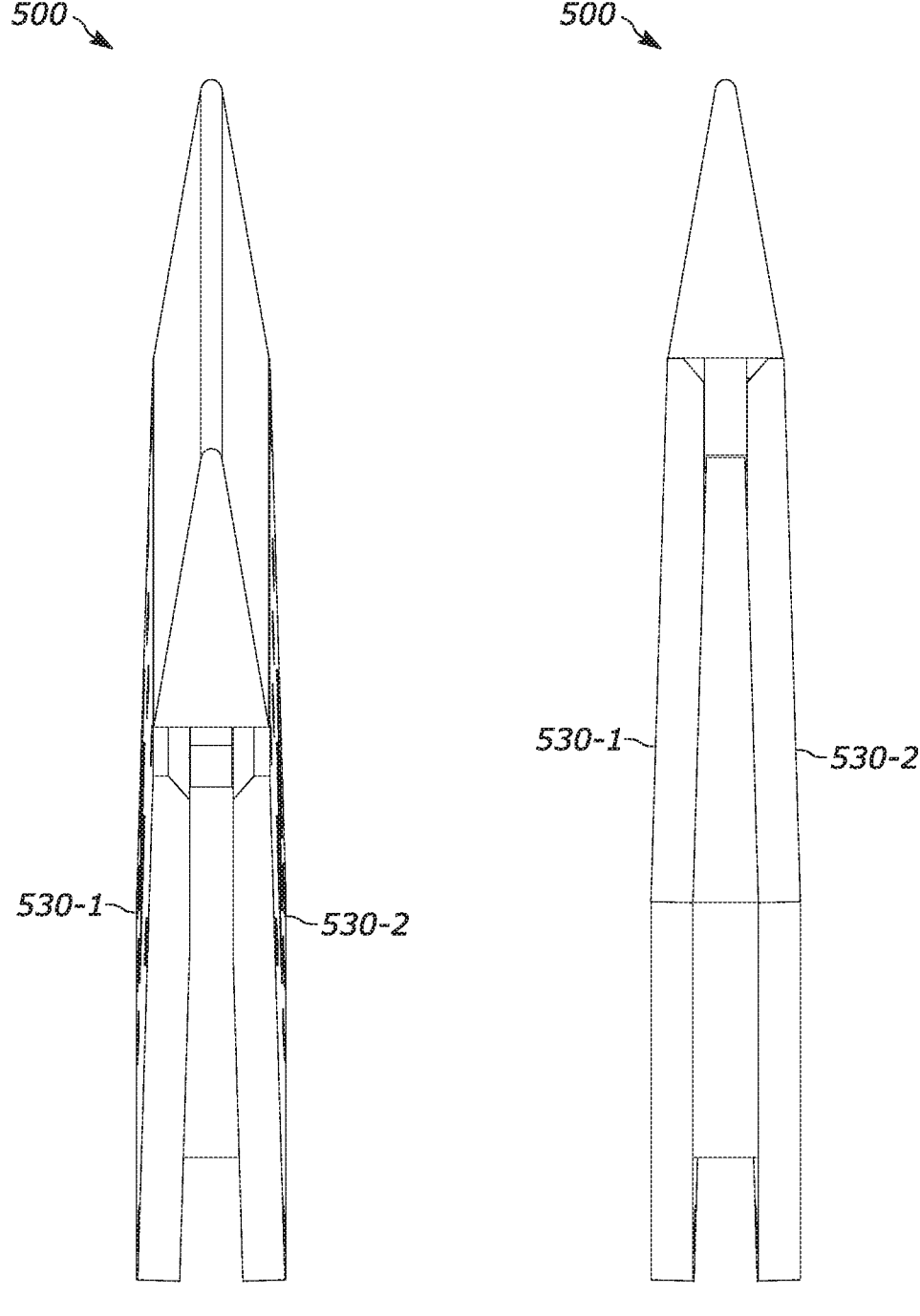
FIG. 5F                    FIG. 5G

APPARATUSES FOR SOIL AND SEED MONITORING

TECHNICAL FIELD

Embodiments of the present disclosure relate to apparatuses for agricultural soil and seed monitoring.

BACKGROUND

In recent years, the availability of advanced location-specific agricultural application and measurement systems (used in so-called "precision farming" practices) has increased grower interest in determining spatial variations in soil properties and in varying input application variables (e.g., planting depth) in light of such variations. However, the available mechanisms for measuring properties such as temperature are either not effectively locally made throughout the field or are not made at the same time as an input (e.g. planting) operation.

BRIEF DESCRIPTION OF THE DRAWINGS

The present disclosure is illustrated by way of example, and not by way of limitation, in the figures of the accompanying drawings and in which:

FIG. 5F illustrates a top view of a soil apparatus 500 in accordance with one embodiment.

FIG. 5G illustrates a bottom view of the soil apparatus 500 in accordance with one embodiment.

BRIEF SUMMARY

A soil apparatus (e.g., a knife) to engage in soil is described herein. In one embodiment, the soil apparatus includes a soil engaging portion to engage with soil and a plurality of sensors disposed in the soil apparatus. In one example, each sensor is independently pivotable to independently position for sensing soil characteristics of soil.

DETAILED DESCRIPTION

All references cited herein are incorporated herein in their entireties. If there is a conflict between a definition herein and in an incorporated reference, the definition herein shall control.

The terms trench and furrow are used interchangeably throughout this specification.

Depth Control and Soil Monitoring Systems

Figure 1:
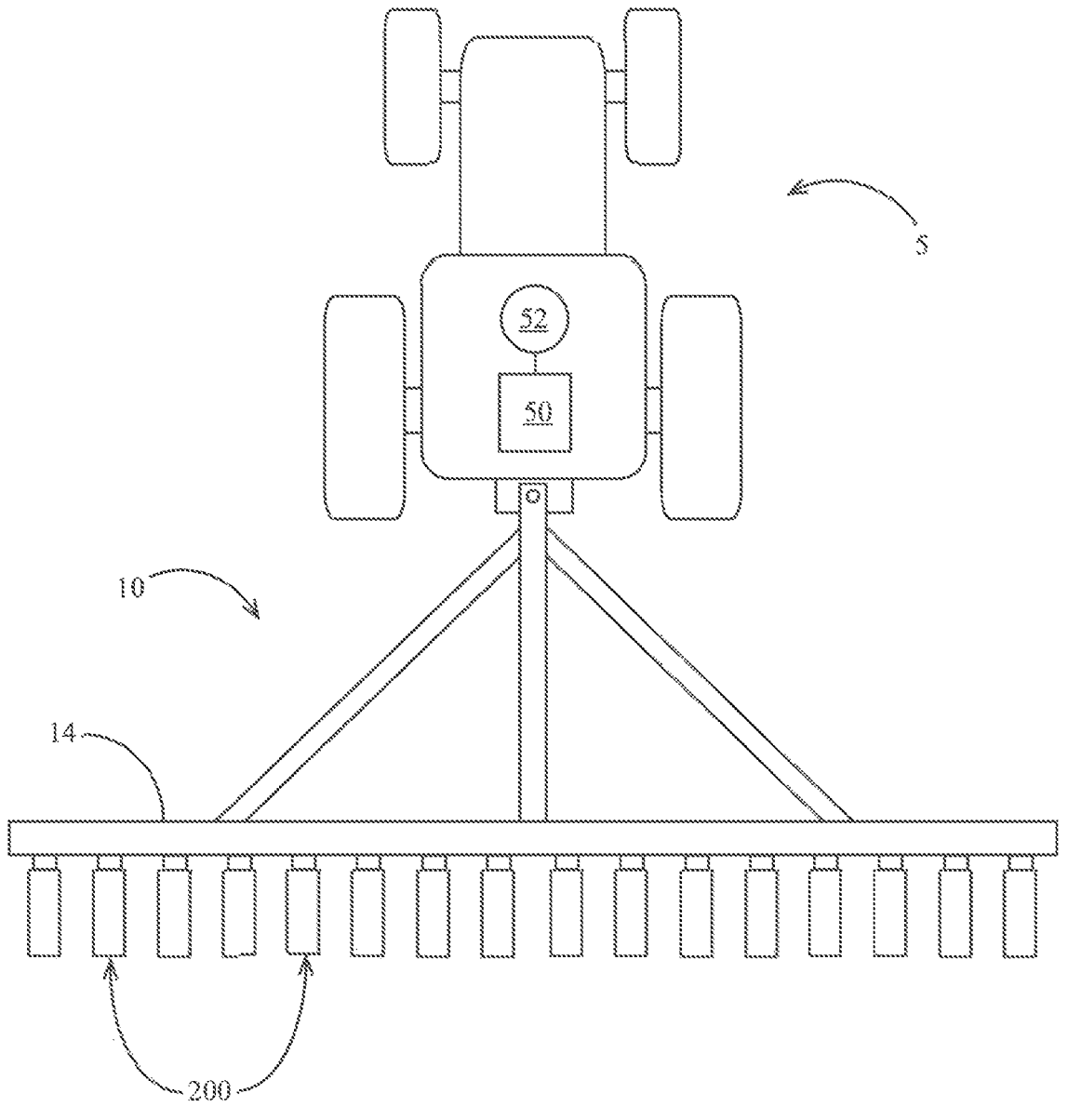
FIG. 1 is a top view of an embodiment of an agricultural planter.

Referring now to the drawings, wherein like reference numerals designate identical or corresponding parts throughout the several views, FIG. 1 illustrates a tractor 5 drawing an agricultural implement, e.g., a planter 10, comprising a toolbar 14 operatively supporting multiple row units 200. An implement monitor 50 preferably including a central processing unit ("CPU"), memory and graphical user interface ("GUI") (e.g., a touch-screen interface) is preferably located in the cab of the tractor 5. A global positioning system ("GPS") receiver 52 is preferably mounted to the tractor 5.

Figure 2:
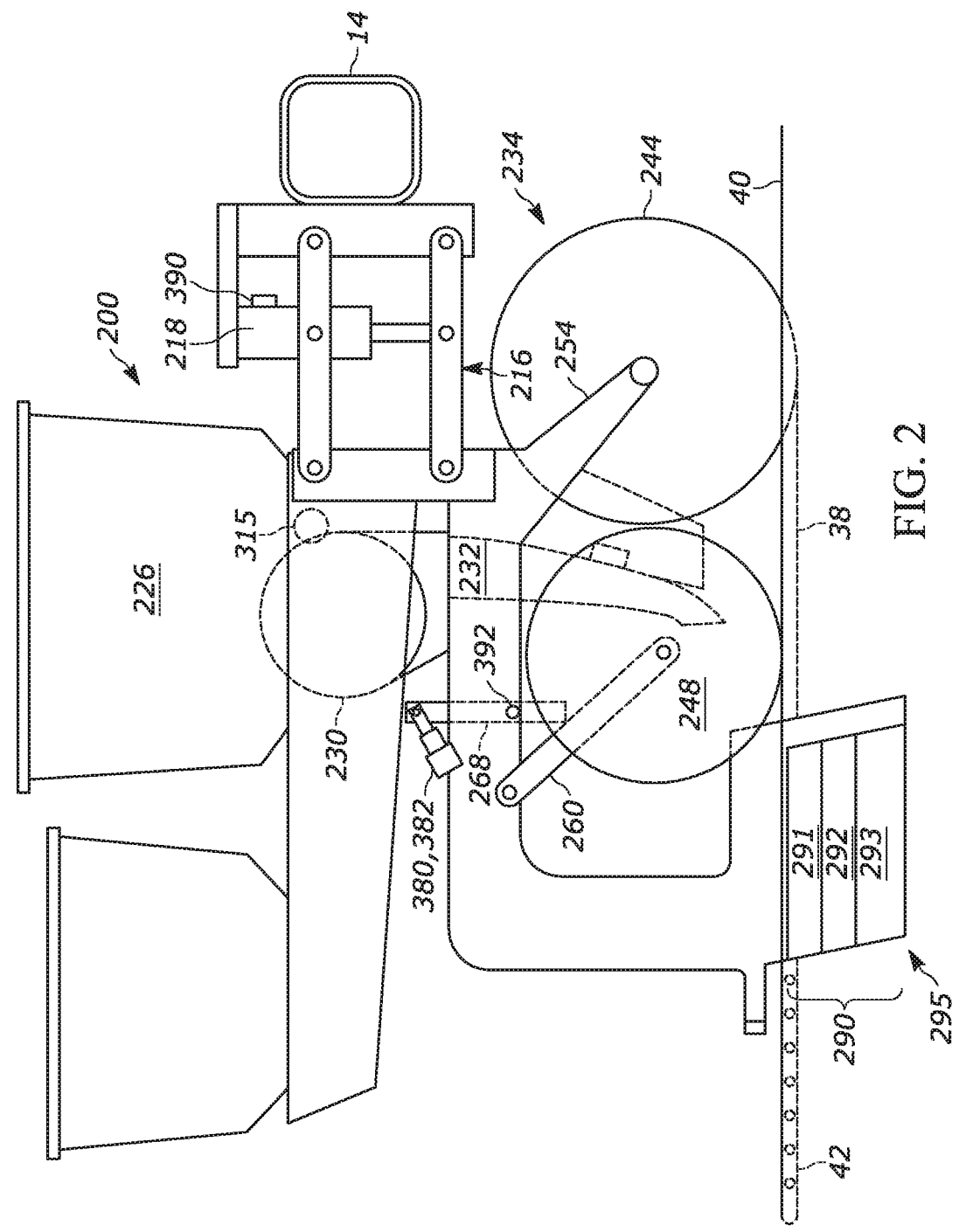
FIG. 2 is a side elevation view of an embodiment of a planter row unit.

Turning to FIG. 2, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve 390 is preferably in fluid communication with the actuator 218 for modifying the lift and/or downforce applied by the actuator. An optional opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A depth adjustment actuator 380 is preferably configured to modify a position of the depth adjustment rocker 268 and thus the height of the gauge wheels 248. The actuator 380 is preferably a linear actuator mounted to the row unit 200 and pivotally coupled to an upper end of the rocker 268. In some embodiments the depth adjustment actuator 380 comprises a device such as that disclosed in International Patent Application No. PCT/US2012/035585 ("the '585 application") or International Patent Application Nos. PCT/US2017/018269 or PCT/US2017/018274. An encoder 382 is preferably configured to generate a signal related to the linear extension of the actuator 380; it should be appreciated that the linear extension of the actuator 380 is related to the depth of the trench 38 when the gauge wheel arms 260 are in contact with the rocker 268. A downforce sensor 392 is preferably configured to generate a signal related to the amount of force imposed by the gauge wheels 248 on the soil 40; in some embodiments the downforce sensor 392 comprises an instrumented pin about which the rocker 268 is pivotally coupled to the row unit 200, such as those instrumented pins disclosed in Applicant's U.S. patent application Ser. No. 12/522,253 (Pub. No. US 2010/0180695).

Continuing to refer to FIG. 2, a seed meter 230 such as that disclosed in Applicant's International Patent Application No. PCT/US2012/030192 is preferably disposed to deposit seeds 42 from a hopper 226 into the trench 38, e.g., through a seed tube 232 disposed to guide the seeds toward the trench. In some embodiments, instead of a seed tube 232, a seed conveyor is implemented to convey seeds from the seed meter to the trench at a controlled rate of speed as disclosed in U.S. patent application Ser. No. 14/347,902 and/or U.S. Pat. No. 8,789,482. In some embodiments, the meter is powered by an electric drive 315 configured to drive a seed disc within the seed meter. In other embodiments, the drive 315 may comprise a hydraulic drive configured to drive the seed disc. A seed sensor 305 (e.g., an optical or electromagnetic seed sensor configured to generate a signal indicating passage of a seed) is preferably mounted to the seed tube 232 and disposed to send light or electromagnetic waves across the path of seeds 42.

A soil apparatus 290 is mounted behind the gauge wheels 248. The soil apparatus 290 (e.g., knife) includes a plurality of sensors 291-293 for sensing soil and seed characteristics. A bottom surface or soil engaging portion 295 of the soil apparatus contacts the soil within a trench 38 created by soil apparatus 290 or an existing trench. An application or seed can be deposited in the trench 38 or a trench created by the soil apparatus 290.

An optional closing system including one or more closing wheels may be pivotally coupled to the row unit 200 and configured to close the trench 38.

Figure 3:
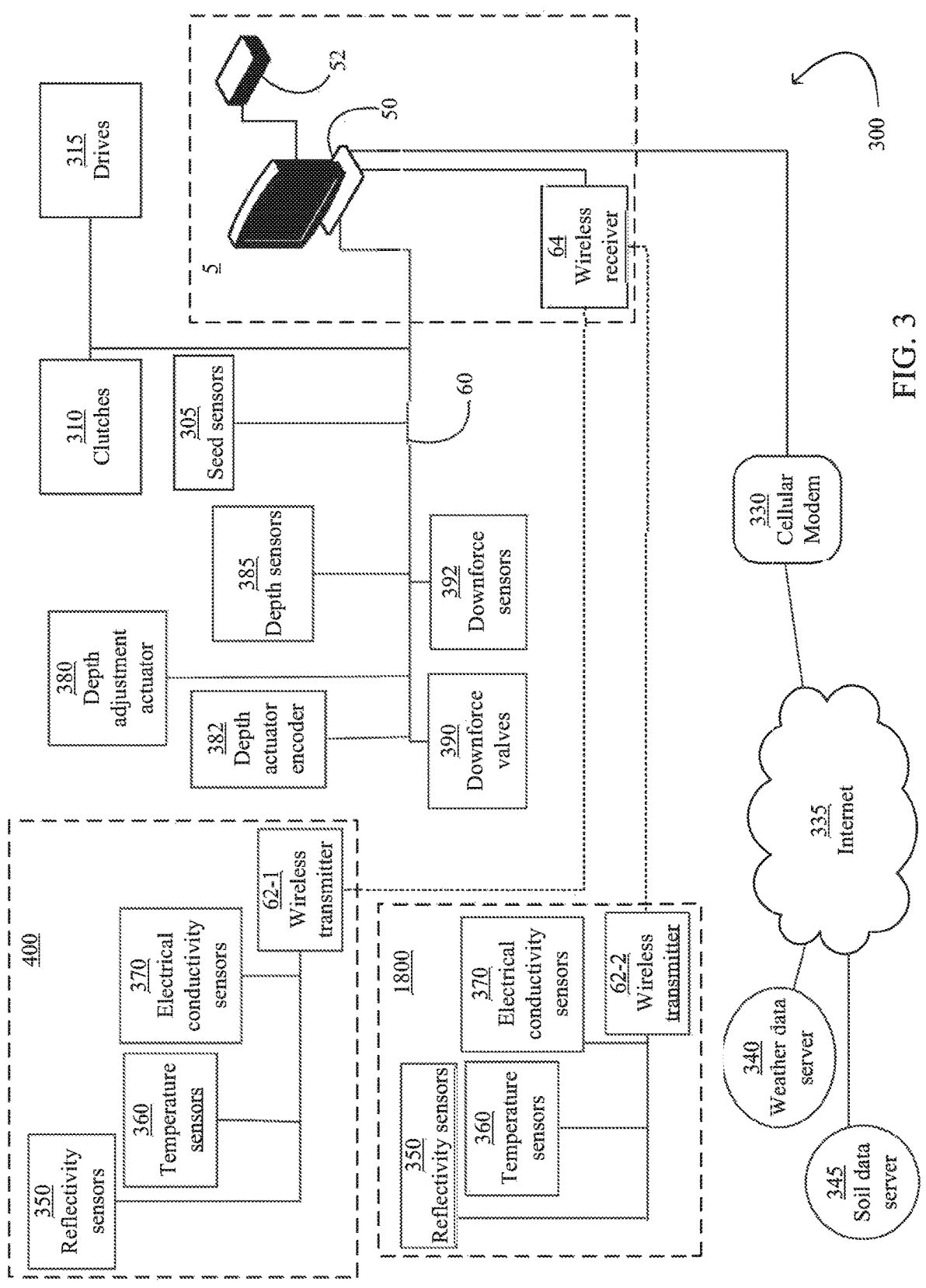
FIG. 3 schematically illustrates an embodiment of a soil monitoring system.

Turning to FIG. 3, a depth control and soil monitoring system 300 is schematically illustrated. The monitor 50 is preferably in data communication with components associated with each row unit 200 including the drives 315, the seed sensors 305, the GPS receiver 52, the downforce sensors 392, the valves 390, the depth adjustment actuator 380, and the depth actuator encoders 382. In some embodiments, particularly those in which each seed meter 230 is not driven by an individual drive 315, the monitor 50 is also preferably in data communication with clutches 310 configured to selectively operably couple the seed meter 230 to the drive 315.

Continuing to refer to FIG. 3, the monitor 50 is preferably in data communication with a cellular modem 330 or other component configured to place the monitor 50 in data communication with the Internet, indicated by reference numeral 335. The internet connection may comprise a wireless connection or a cellular connection. Via the Internet connection, the monitor 50 preferably receives data from a weather data server 340 and a soil data server 345. Via the Internet connection, the monitor 50 preferably transmits measurement data (e.g., measurements described herein) to a recommendation server (which may be the same server as the weather data server 340 and/or the soil data server 345) for storage and receives agronomic recommendations (e.g., planting recommendations such as planting depth, whether to plant, which fields to plant, which seed to plant, or which crop to plant) from a recommendation system stored on the server; in some embodiments, the recommendation system updates the planting recommendations based on the measurement data provided by the monitor 50.

Continuing to refer to FIG. 3, the monitor 50 is also preferably in data communication with one or more temperature sensors 360 mounted to the planter 10 and configured to generate a signal related to the temperature of soil being worked by the planter row units 200. The monitor 50 is preferably in data communication with one or more reflectivity sensors 350 mounted to the planter 10 and configured to generate a signal related to the reflectivity of soil being worked by the planter row units 200.

Referring to FIG. 3, the monitor 50 is preferably in data communication with one or more electrical conductivity sensors 370 mounted to the planter 10 and configured to generate a signal related to the temperature of soil being worked by the planter row units 200.

In some embodiments, a first set of reflectivity sensors 350, temperature sensors 360, and electrical conductivity sensors are mounted to a soil apparatus 400 and disposed to measure reflectivity, temperature and electrical conductivity, respectively, of soil in the trench 38. In some embodiments, a second set of reflectivity sensors 350, temperature sensors 360, and electrical conductivity sensors 370 are mounted to a reference sensor assembly 1800 and disposed to measure reflectivity, temperature and electrical conductivity, respectively, of the soil, preferably at a depth different than the sensors on the soil apparatus 400.

In some embodiments, a subset of the sensors are in data communication with the monitor 50 via a bus 60 (e.g., a CAN bus). In some embodiments, the sensors mounted to the soil apparatus 400 and the reference sensor assembly 1800 are likewise in data communication with the monitor 50 via the bus 60. However, in the embodiment illustrated in FIG. 3, the sensors mounted to the soil apparatus 400 and the reference sensor assembly 1800 are in data communication with the monitor 50 via a first wireless transmitter 62-1 and a second wireless transmitter 62-2, respectively. The wireless transmitters 62 at each row unit are preferably in data communication with a single wireless receiver 64 which is in turn in data communication with the monitor 50. The wireless receiver may be mounted to the toolbar 14 or in the cab of the tractor 5.

Soil Monitoring, Seed Monitoring and Seed Firming Apparatus

Figure 4A:
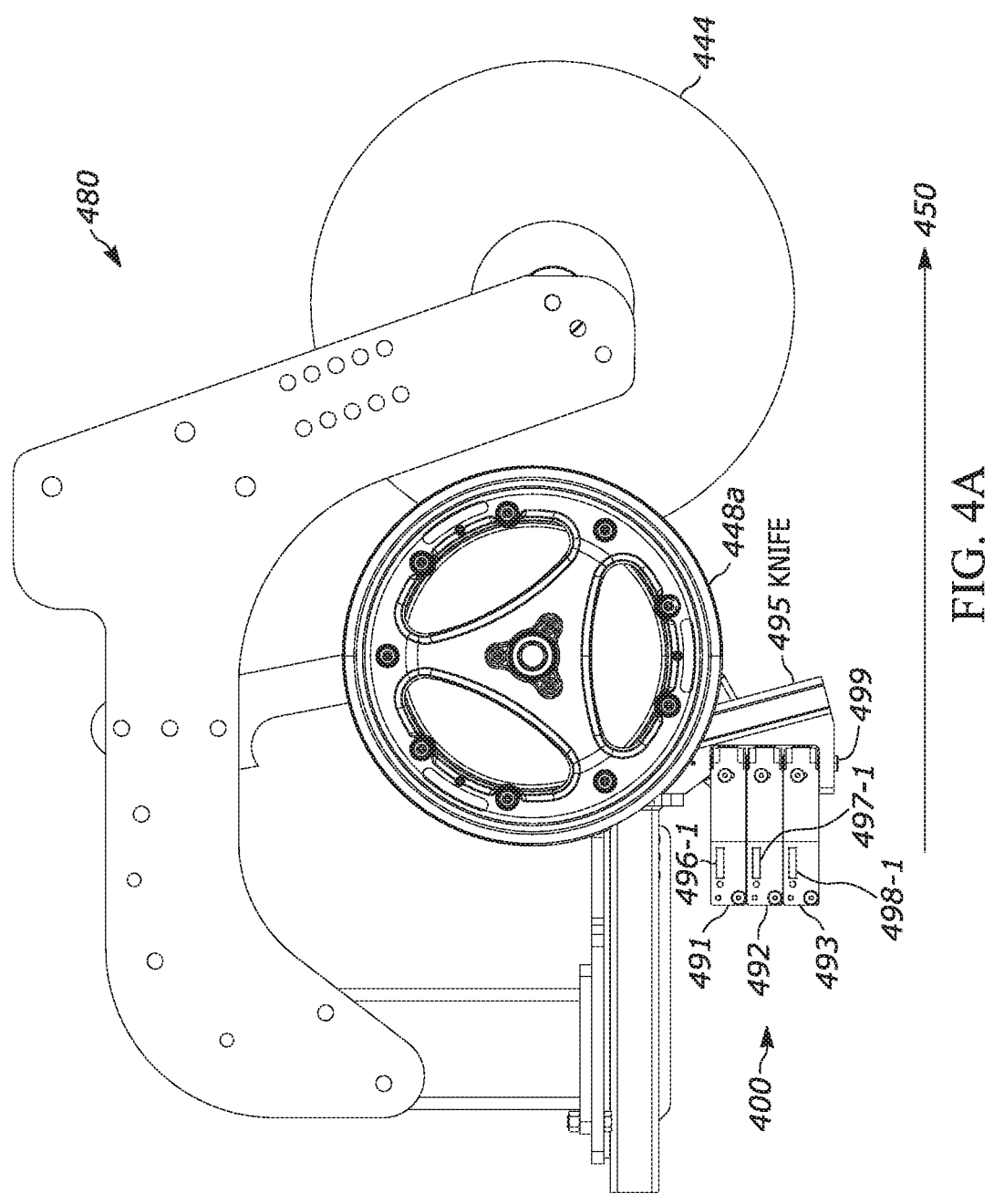
FIGS. 4A-4B illustrate an embodiment of a row unit 480 that includes a soil apparatus that is illustrated having a plurality of sensors for sensing soil characteristics.
Figure 4B:
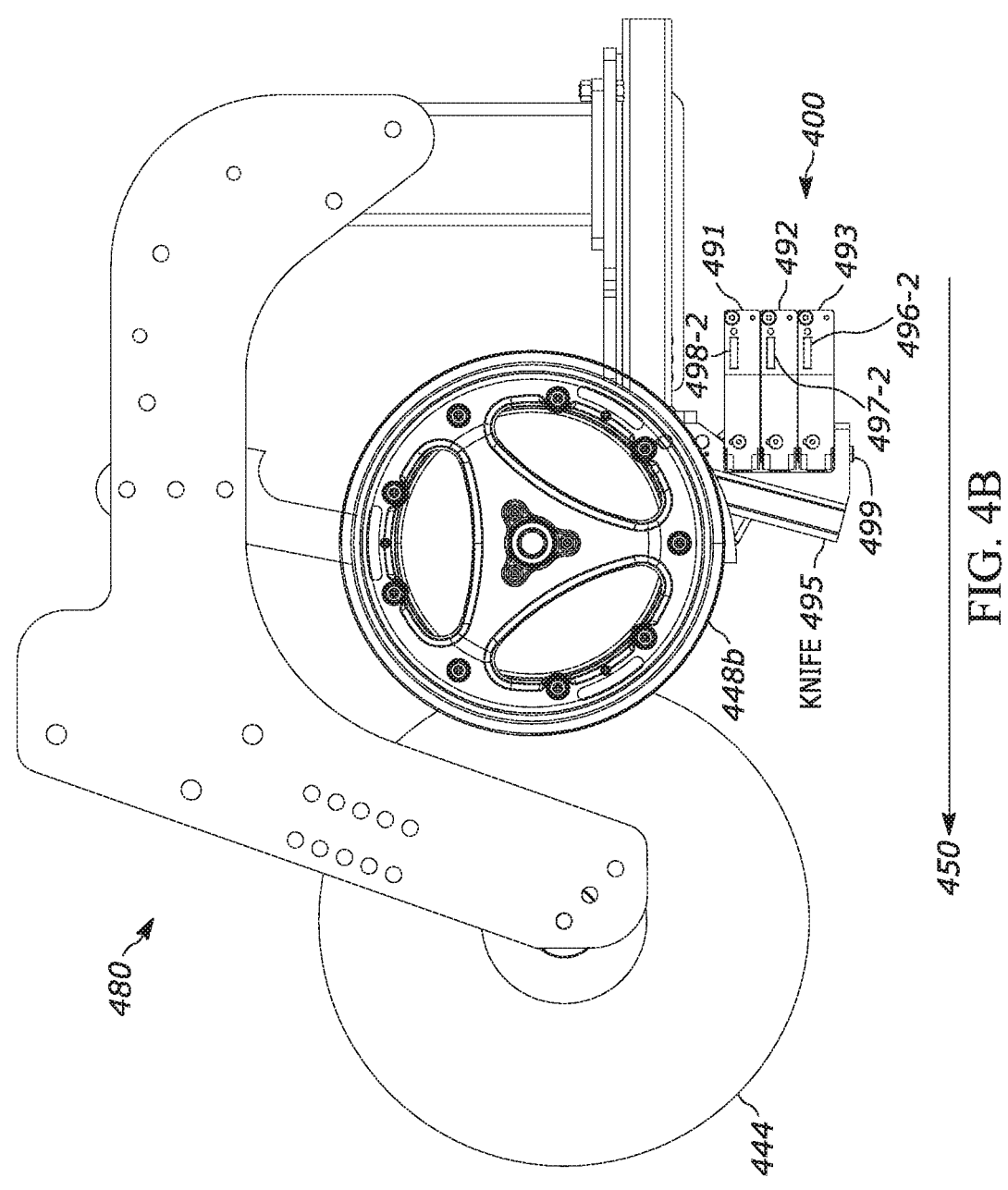
Figure 4C:
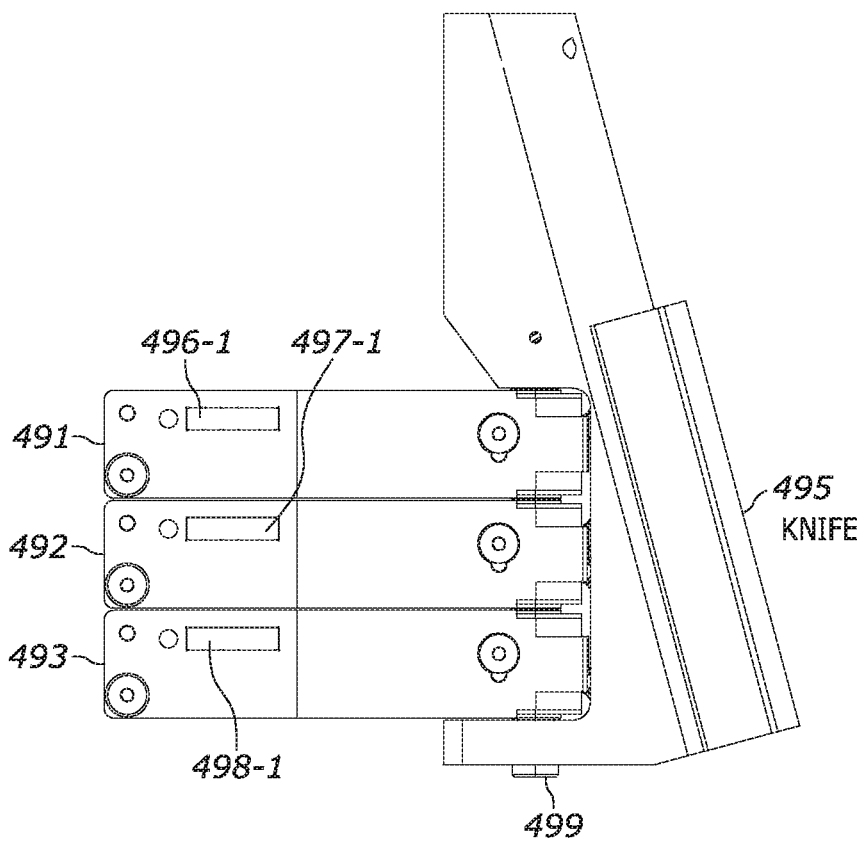
FIG. 4C illustrates a pivotable axis 499 of the sensors of the soil apparatus in accordance with one embodiment.

Turning to FIGS. 4A-4C, an embodiment of a row unit 480 includes a soil apparatus that is illustrated having a plurality of sensors for sensing soil and seed characteristics. The row unit 480 (e.g., seeder row unit, sidedress bar, tillage unit) can be attached to any type of implement. The row unit attaches to a frame 14 of an implement having a direction 450 of travel through a field. The row unit includes bars 16 and 18, soil apparatus 400, gauge wheels 448a and 448b, and opening disc 444 (e.g., coulter blade 444). The soil apparatus 400 includes sensors 491-493 that are aligned on a first side of the soil apparatus and optional sensors 491-493 that are aligned on a second side of the soil apparatus. Each sensor is pivotable to follow a trench and cause less applied pressure to lenses of the sensors. FIG. 4C illustrates a pivotable axis 499 of the sensors. The lenses can be positioned within windows 496-1, 497-1, 498-1, 496-2, 497-2, and 498-2 of the sensors. A leading edge of the soil apparatus forms a knife 495 to a cut a trench in soil.

The windows 496-1, 497-1, 498-1, 496-2, 497-2, and 498-2 are preferably mounted flush with a lower surface of the soil apparatus such that soil flows underneath the window without building up over the window or along an edge thereof. An electrical connection preferably connects the sensor circuit board to a wire or bus (not shown) placing the sensor circuit board in data communication with the monitor 50.

Figure 5A:
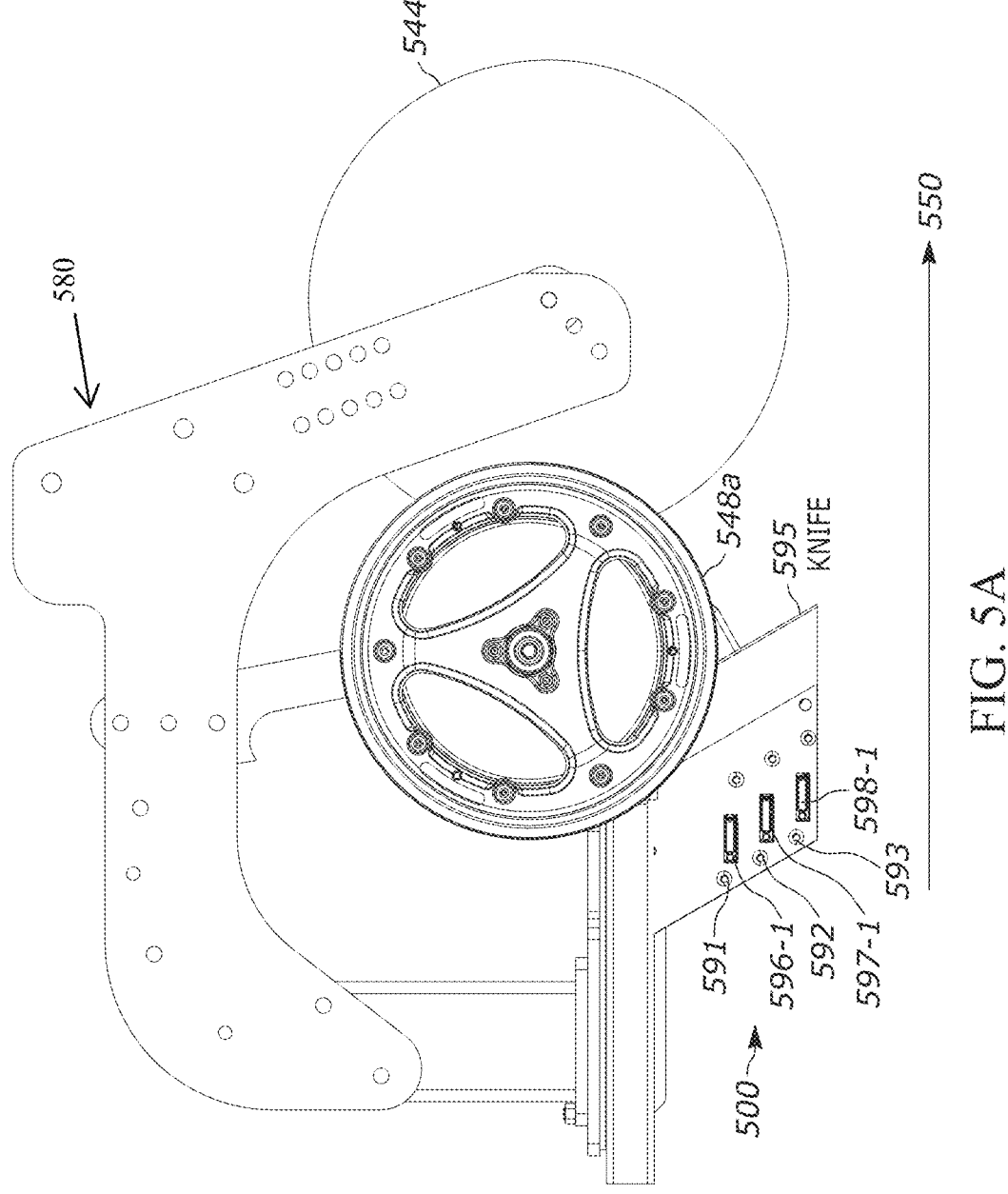
FIGS. 5A and 5B illustrate a row unit 580 that includes a soil apparatus in accordance with another embodiment.

FIG. 5A illustrates a row unit 580 that includes a soil apparatus in accordance with another embodiment. The row unit 580 (e.g., seeder row unit, sidedress bar, tillage unit) can be attached to any type of implement. The row unit attaches to a frame 14 of an implement having a direction 550 of travel through a field. The row unit includes bars 16 and 18, soil apparatus 500, gauge wheels 548a and 548b, and opening disc 544 (e.g., coulter blade 544). The soil apparatus

500 includes sensors 591-593 that are aligned on a first side of the soil apparatus and optional sensors 591-593 that are aligned on a second side of the soil apparatus. The lenses can be positioned within windows 596-1, 597-1, 598-1, 596-2, 597-2, and 598-2 of the sensors.

Figure 5B:
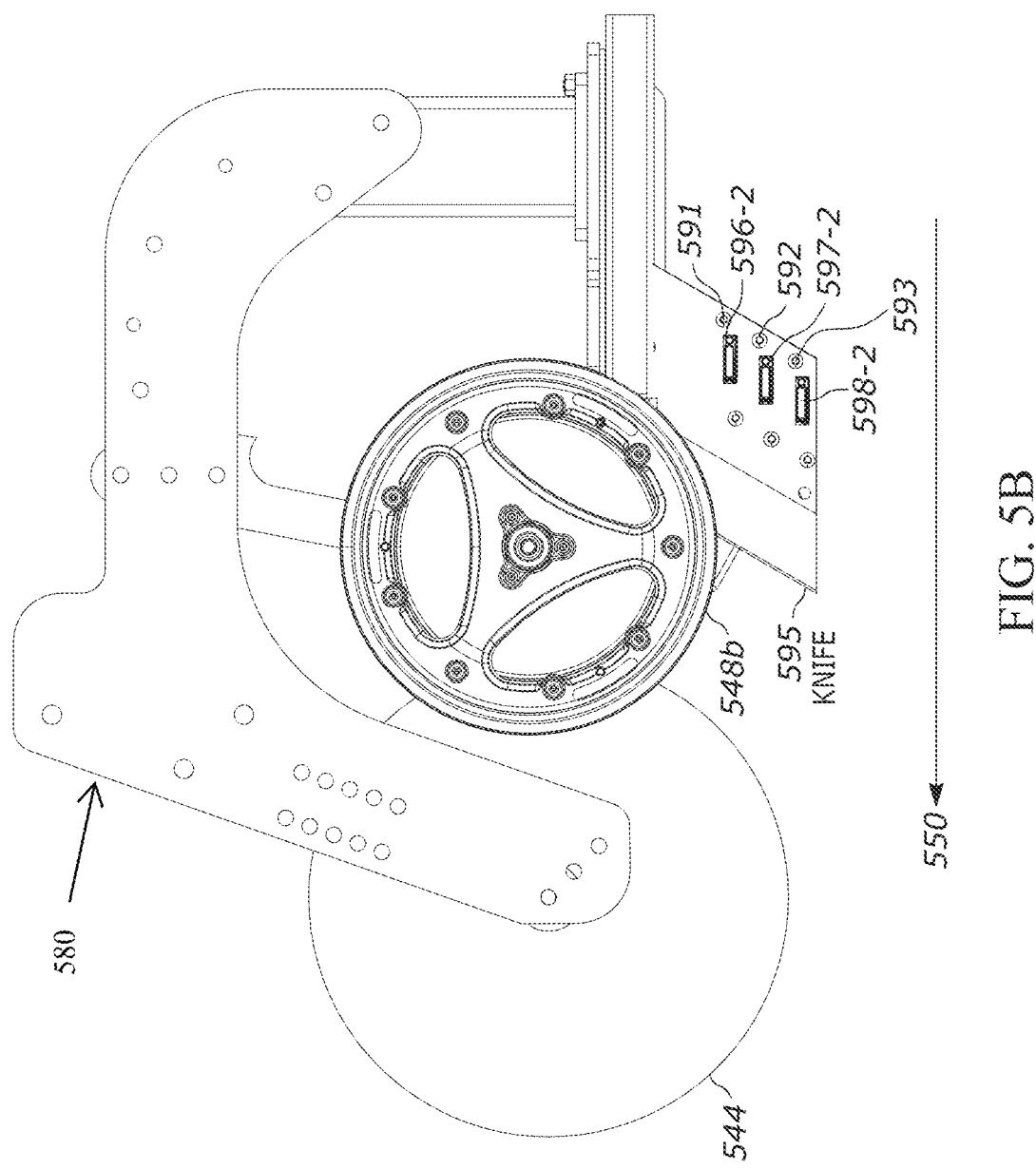

FIG. 5B illustrates a top view of the soil apparatus 500 in accordance with one embodiment. The soil apparatus 500 includes sensors 591-593 having sensing windows 596-2, 597-2, and 598-2.

Figure 5C:
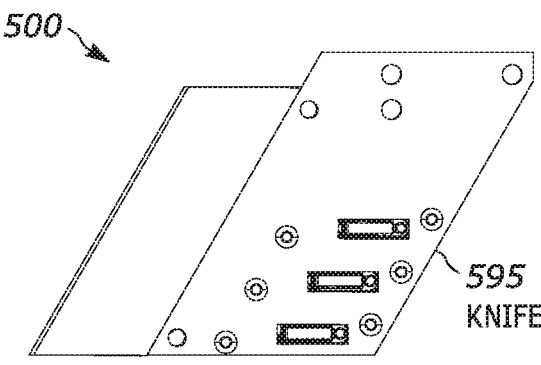
FIG. 5C illustrates a first side of the soil apparatus 500 that includes a first stack of sensors.
Figure 5D:
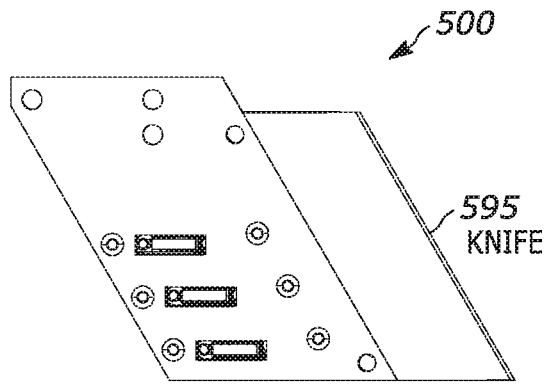
FIG. 5D illustrates a second side of the soil apparatus 500 that includes a second stack of sensors.
Figure 5E:
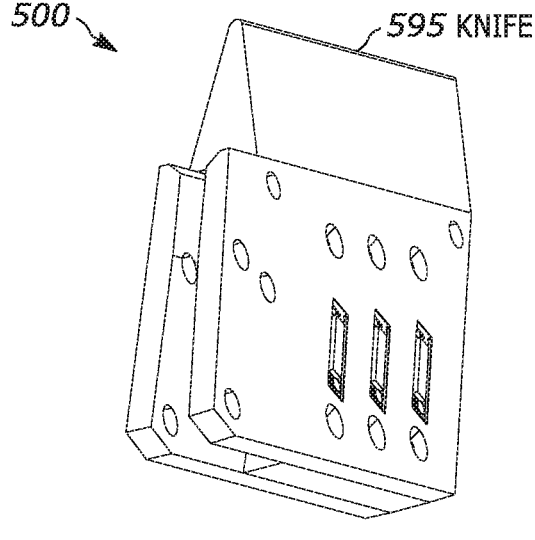
FIG. 5E illustrates an elevated view of the soil apparatus.

FIG. 5C illustrates a first side of the soil apparatus 500 that includes a first stack of sensors. A leading edge of the soil apparatus forms a knife 595. FIG. 5D illustrates a second side of the soil apparatus 500 that includes a second stack of sensors. FIG. 5E illustrates an elevated view of the soil apparatus.

FIG. 5F illustrates a top view and FIG. 5G illustrates a bottom view of the soil apparatus 500 in accordance with one embodiment. The sides 530-1 and 530-2 of the soil apparatus slope outwards slightly (e.g., 1-5 degrees) from a top portion to a bottom portion of the soil apparatus.

Soil apparatus 400, 500 can be disposed between gauge wheels 448a, 448b or 548a, 548b, respectively so that the weight of row unit 480, 580 transferred through gauge wheels 448a, 448b, 548a, 548b, respectively, keeps soil from lifting as soil apparatus 400, 500 is pulled through a field to reduce mixing of soils from different depths.

Wear resistant material can be applied to any surface to increase wear. Examples of wear resistant material includes, but is not limited to, tungsten carbide. Wear resistant material can be applied to knife 495, knife 595, or any surface on soil apparatus 400, 500 not covered by windows 496-1, 497-1, 498-1, 496-2, 497-2, 498-2, 596-1, 597-1, 598-1, 596-2, 597-2, and 598-2.

Figure 6:
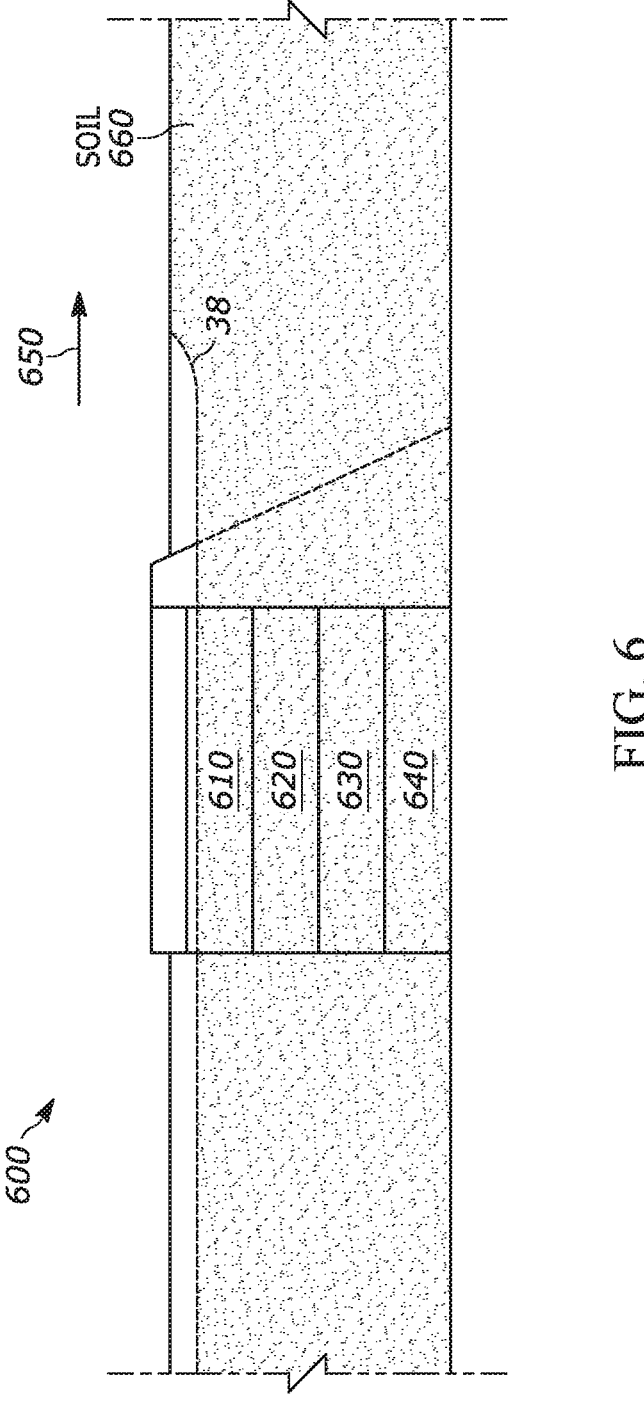
FIG. 6 illustrates a soil apparatus 600 (e.g., soil apparatus 400, 500) having a plurality of sensors in accordance with one embodiment.

FIG. 6 illustrates a soil apparatus 600 (e.g., soil apparatus 400, 500) having a plurality of sensors in accordance with one embodiment. The soil apparatus 600 may be disposed and configured to be received at least partially within the v-shaped trench 38 or within a trench created by the soil apparatus 600. The soil apparatus 600 includes sensors 610, 620, 630, 640 for sensing soil and seed characteristics. The sensors can be disposed within a body of the soil apparatus or disposed on either side or both sides of the soil apparatus 600. The sensors may include emitters and receivers. Each of the sensors on opposing sides (e.g., 291, 292, 293, 491, 492, 493, 591, 592, 593, 610, 620, 630, 640, etc.) can be at a different depth instead of at the same depth on each side. This allows for stacking of sensors to obtain depths that are closer together without having fitting interference from sensors that can't be stacked that close together.

The soil apparatuses 400, 500, and 600 can be a knife for cutting a trench in soil or can be moved across a previously opened trench for sensing soil characteristics as described herein.

Figure 7A:
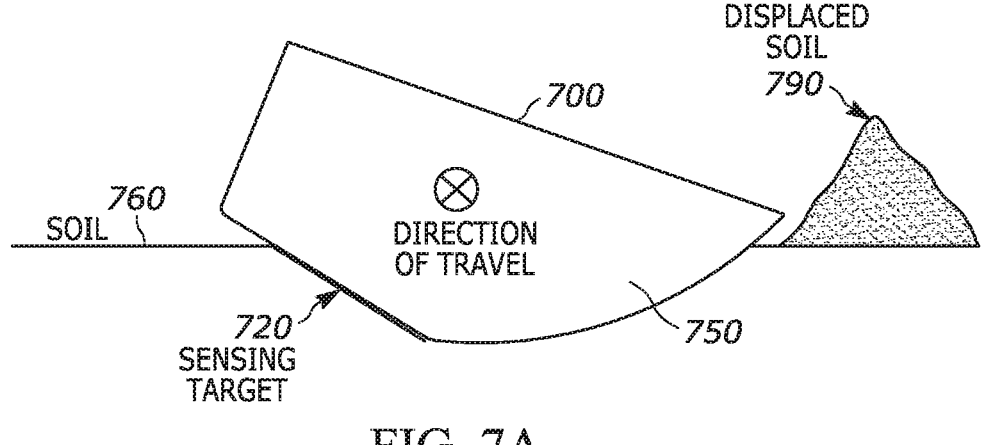
FIGS. 7A-7B illustrate a soil apparatus 700 (e.g., mouldboard 700) having a plurality of sensors in accordance with another embodiment.
Figure 7B:
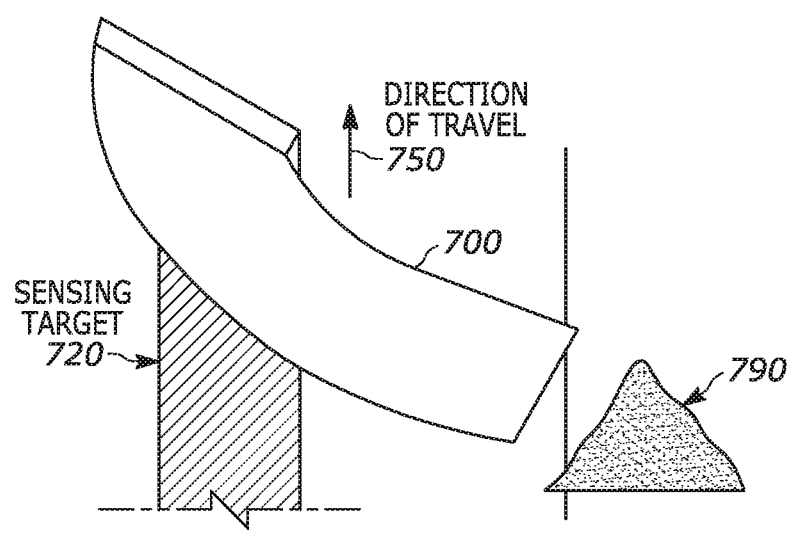

FIGS. 7A-7B illustrate a soil apparatus 700 (e.g., mouldboard 700) having a plurality of sensors in accordance with another embodiment. The soil apparatus 700 of an implement (e.g., tillage tool) may be disposed in soil 760 and causes displaced soil 790 when the soil apparatus 700 moves through a field. In one example, a mouldboard 700 (e.g., mouldboard plough) has a curved portion with a single radius or multi-radius design to cut, mix, and roll soil off the mouldboard. The soil apparatus 700 includes sensors for sensing soil characteristics of a sensing target 720.

Figure 8:
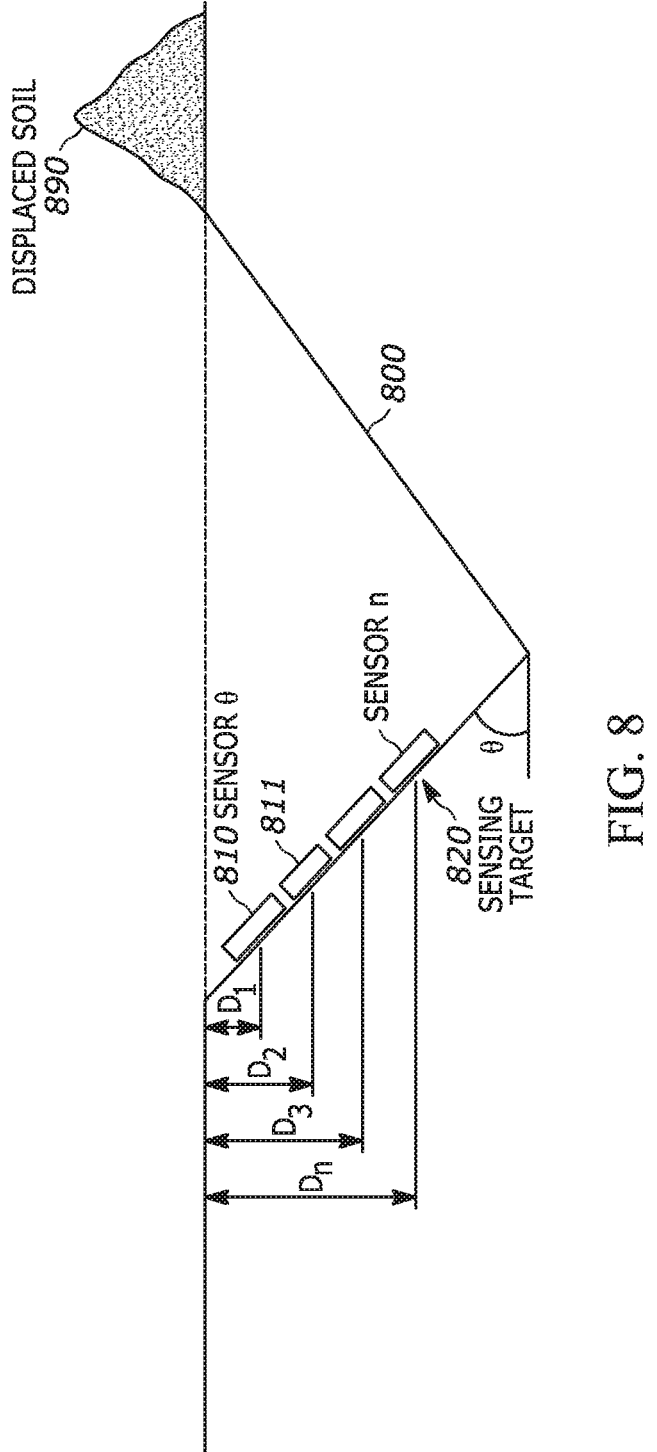
FIG. 8 illustrates a soil apparatus having sensors positioned at different depths D1, D2, D3, Dn to sense a sensing target in one embodiment.

In one example, each of the sensors 810, 811, . . . n of soil apparatus 700 can be at a different depth D1, D2, D3, Dn to sense a sensing target 820 as illustrated in FIG. 8. The soil apparatus 700 forms an angle theta with respect to a ground level. The angle theta is less than an angle of repose of soil, which is a steepest angle of descent or dip to a horizontal plane to which a material (e.g., soil) can be piled without sliding.

The soil apparatus of the present application preferably includes a plurality of sensors (e.g., sensors 291-293, 491-493, 591-593, 610, 620, 630, 640, 810, 811, etc.) that may be reflectivity, capacitive moisture, electronic tensiometer, temperature, and electrical conductivity sensors. Each reflectivity sensor is preferably disposed and configured to measure reflectivity of soil; in a preferred embodiment, the reflectivity sensor is disposed to measure soil in the trench 38 created by soil apparatus (400, 500, 600) or an existing trench 38, and preferably at the bottom of the trench. The reflectivity sensor preferably includes a lens disposed near the soil. In some embodiments the reflectivity sensor comprises one of the embodiments disclosed in U.S. Pat. No. 8,204,689 and/or U.S. Provisional Patent Application 61/824,975 ("the '975 application"). In various embodiments, the reflectivity sensor is configured to measure reflectivity in the visible range (e.g., 400 and/or 600 nanometers), in the near-infrared range (e.g., 940 nanometers) and/or elsewhere the infrared range.

The soil apparatus may also include a capacitive moisture sensor disposed and configured to measure capacitance moisture of the soil in the seed trench 38, and preferably at the bottom of trench 38.

The soil apparatus 400 may also include an electronic tensiometer sensor disposed and configured to measure soil moisture tension of the soil in the seed trench 38, and preferably at the bottom of trench 38.

Alternatively, soil moisture tension can be extrapolated from capacitive moisture measurements or from reflectivity measurements (such as at 1450 nm). This can be done using a soil water characteristic curve based on the soil type.

The soil apparatus may also include a temperature sensor. The temperature sensor is preferably disposed and configured to measure temperature of soil; in a preferred embodiment, the temperature sensor is disposed to measure soil in the trench 38, preferably at or adjacent the bottom of the trench 38. In other embodiments, the temperature sensor may comprise a non-contact temperature sensor such as an infrared thermometer. In some embodiments, other measurements made by the system 300 (e.g., reflectivity measurements, electrical conductivity measurements, and/or measurements derived from those measurements) are temperature-compensated using the temperature measurement made by the temperature sensor. The adjustment of the temperature-compensated measurement based on temperature is preferably carried out by consulting an empirical look-up table relating the temperature-compensated measurement to soil temperature. For example, the reflectivity measurement at a near-infrared wavelength may be increased (or in some examples, reduced) by 1% for every 1 degree Celsius in soil temperature above 10 degrees Celsius.

The soil apparatus preferably includes a plurality of electrical conductivity sensors. Each electrical conductivity sensor is preferably disposed and configured to measure electrical conductivity of soil; in a preferred embodiment, the electrical conductivity sensor is disposed to measure electrical conductivity of soil in the trench 38, preferably at or adjacent the bottom of the trench 38.

It should be appreciated that any of the electrical conductivity sensors described herein may measure conductivity by any of the following combinations: (1) between a first probe on a ground-engaging row unit component (e.g., on a soil apparatus, a row cleaner wheel, an opening disc, a shoe, a shank, a frog, a coulter, or a closing wheel) and a second probe on the same ground-engaging row unit component of the same row unit; (2) between a first probe on a first ground-engaging row unit component (e.g., on a soil apparatus, a row cleaner wheel, an opening disc, a shoe, a shank, a frog, a coulter, or a closing wheel) and a second probe on a second ground-engaging row unit component (e.g., on a soil apparatus, a row cleaner wheel, an opening disc, a shoe, a shank, a frog, a coulter, or a closing wheel) of the same row unit; or (3) between a first probe on a first ground-engaging row unit component (e.g., on a soil apparatus, a row cleaner wheel, an opening disc, a shoe, a shank, a frog, a coulter, or a closing wheel) on a first row unit and a second probe on a second ground-engaging row unit component (e.g., on a soil apparatus, a row cleaner wheel, an opening disc, a shoe, a shank, a frog, a coulter, or a closing wheel) on a second row unit. Either or both of the row units described in combinations 1 through 3 above may comprise a planting row unit or another row unit (e.g., a tillage row unit or a dedicated measurement row unit) which may be mounted forward or rearward of the toolbar.

The reflectivity sensors 350, the temperature sensors 360, and the electrical conductivity sensors 370 (collectively, the "seed apparatus-mounted sensors") are preferably in data communication with the monitor 50. In some embodiments, the seed apparatus-mounted sensors are in data communication with the monitor 50 via a transceiver (e.g., a CAN transceiver) and the bus 60. In other embodiments, these sensors are in data communication with the monitor 50 via a wireless transmitter 62-1 (preferably mounted to the soil apparatus) and wireless receiver 64.

It should be appreciated that the sensor embodiments of FIGS. 4-8 may be mounted to and used in conjunction with implements other than seed planters such as tillage tools. For example, the soil apparatus could be disposed to contact soil in a trench opened by (or soil surface otherwise passed over by) a tillage implement such as a disc harrow or soil ripper. On such equipment, the sensors could be mounted on a part of the equipment that contacts soil or on any extension that is connected to a part of the equipment and contacts soil. It should be appreciated that in some such embodiments, the soil apparatus would not contact planted seed but would still measure and report soil characteristics as otherwise disclosed herein.

In certain embodiments, the wavelength used in reflectivity sensor 350 is in a range of 400 to 1600 nm. In another embodiment, the wavelength is 550 to 1450 nm. In one embodiment, there is a combination of wavelengths. In one embodiment, sensor 350 has a combination of 574 nm, 850 nm, 940 nm, and 1450 nm. In another embodiment, sensor 350 has a combination of 589 nm, 850 nm, 940 nm, and 1450 nm. In another embodiment, sensor 350 has a combination of 640 nm, 850 nm, 940 nm, and 1450 nm. In another embodiment, the 850 nm wavelength in any of the previous embodiments is replaced with 1200 nm. In another embodiment, the 574 nm wavelength of any of the previous embodiments is replaced with 590 nm. For each of the wavelengths described herein, it is to be understood that the number is actually +/−10 nm of the listed value. In certain embodiments, the combination of wavelengths is 460 nm, 589 nm, 850 nm, 1200 nm, and 1450 nm is used.

a. In other embodiments, any of the sensors do not need to be disposed in a seed apparatus, and in particular any of the embodiments illustrated in FIGS. 4-8. The sensors can be in any implement that is disposed on an agricultural implement in contact with the soil. Examples of an agricultural implement include, but are not limited to, a toolbar, planters, harvesters, sprayers, side dress bars, tillers, fertilizer spreaders, and tractor.

Figure 9:
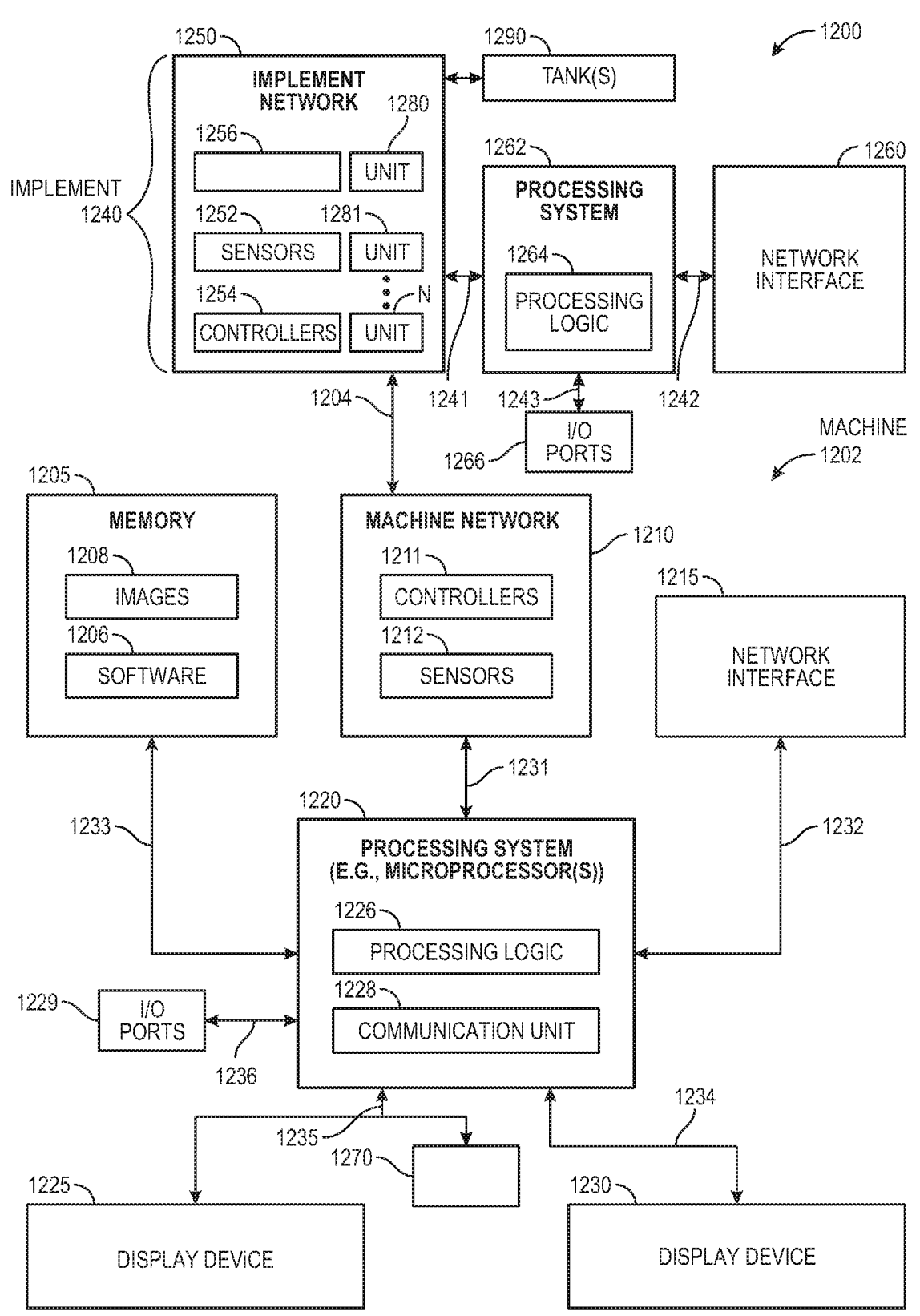
FIG. 9 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment.

FIG. 9 shows an example of a system 1200 that includes a machine 1202 (e.g., tractor, combine harvester, etc.) and an implement 1240 (e.g., planter, sidedress bar, cultivator, plough, sprayer, spreader, irrigation implement, etc.) in accordance with one embodiment. The machine 1202 includes a processing system 1220, memory 1205, machine network 1210 (e.g., a controller area network (CAN) serial bus protocol network, an ISOBUS network, etc.), and a network interface 1215 for communicating with other systems or devices including the implement 1240. The machine network 1210 includes sensors 1212 (e.g., speed sensors), controllers 1211 (e.g., GPS receiver, radar unit) for controlling and monitoring operations of the machine or implement. The network interface 1215 can include at least one of a GPS transceiver, a WLAN transceiver (e.g., WiFi), an infrared transceiver, a Bluetooth transceiver, Ethernet, or other interfaces from communications with other devices and systems including the implement 1240. The network interface 1215 may be integrated with the machine network 1210 or separate from the machine network 1210 as illustrated in FIG. 12. The I/O ports 1229 (e.g., diagnostic/on board diagnostic (OBD) port) enable communication with another data processing system or device (e.g., display devices, sensors, etc.).

In one example, the machine performs operations of a tractor that is coupled to an implement for planting applications of a field. The planting data for each row unit of the implement can be associated with locational data at time of application to have a better understanding of the planting for each row and region of a field. Data associated with the planting applications can be displayed on at least one of the display devices 1225 and 1230. The display devices can be integrated with other components (e.g., processing system 1220, memory 1205, etc.) to form the monitor 50.

The processing system 1220 may include one or more microprocessors, processors, a system on a chip (integrated circuit), or one or more microcontrollers. The processing system includes processing logic 1226 for executing software instructions of one or more programs and a communication unit 1228 (e.g., transmitter, transceiver) for transmitting and receiving communications from the machine via machine network 1210 or network interface 1215 or implement via implement network 1250 or network interface 1260. The communication unit 1228 may be integrated with the processing system or separate from the processing system. In one embodiment, the communication unit 1228 is in data communication with the machine network 1210 and implement network 1250 via a diagnostic/OBD port of the I/O ports 1229.

Processing logic 1226 including one or more processors or processing units may process the communications received from the communication unit 1228 including agricultural data (e.g., GPS data, planting application data, soil characteristics, any data sensed from sensors of the implement 1240 and machine 1202, etc.). The system 1200 includes memory 1205 for storing data and programs for execution (software 1206) by the processing system. The memory 1205 can store, for example, software components such as planting application software for analysis of soil and planting applications for performing operations of the present disclosure, or any other software application or module, images (e.g., captured images of seed, crops, soil, furrow, soil clods, row units, etc.), alerts, maps, etc. The memory 1205 can be any known form of a machine readable non-transitory storage medium, such as semiconductor memory (e.g., flash; SRAM; DRAM; etc.) or non-volatile memory, such as hard disks or solid-state drive. The system can also include an audio input/output subsystem (not shown) which may include a microphone and a speaker for, for example, receiving and sending voice commands or for user authentication or authorization (e.g., biometrics).

The processing system 1220 communicates bi-directionally with memory 1205, machine network 1210, network interface 1215, header 1280, display device 1230, display device 1225, and I/O ports 1229 via communication links 1231-1236, respectively. The processing system 1220 can be integrated with the memory 1205 or separate from the memory 1205.

Display devices 1225 and 1230 can provide visual user interfaces for a user or operator. The display devices may include display controllers. In one embodiment, the display device 1225 is a portable tablet device or computing device with a touchscreen that displays data (e.g., planting application data, captured images, localized view map layer, high definition field maps of seed germination data, seed environment data, as-planted or as-harvested data or other agricultural variables or parameters, yield maps, alerts, etc.) and data generated by an agricultural data analysis software application and receives input from the user or operator for an exploded view of a region of a field, monitoring and controlling field operations. The operations may include configuration of the machine or implement, reporting of data, control of the machine or implement including sensors and controllers, and storage of the data generated. The display device 1230 may be a display (e.g., display provided by an original equipment manufacturer (OEM)) that displays images and data for a localized view map layer, as-applied fluid application data, as-planted or as-harvested data, yield data, seed germination data, seed environment data, controlling a machine (e.g., planter, tractor, combine, sprayer, etc.), steering the machine, and monitoring the machine or an implement (e.g., planter, combine, sprayer, etc.) that is connected to the machine with sensors and controllers located on the machine or implement.

A cab control module 1270 may include an additional control module for enabling or disabling certain components or devices of the machine or implement. For example, if the user or operator is not able to control the machine or implement using one or more of the display devices, then the cab control module may include switches to shut down or turn off components or devices of the machine or implement.

The implement 1240 (e.g., planter, cultivator, plough, sprayer, spreader, irrigation implement, etc.) includes an implement network 1250, a processing system 1262, a network interface 1260, and optional input/output ports 1266 for communicating with other systems or devices including the machine 1202. The implement network 1250 (e.g., a controller area network (CAN) serial bus protocol network, an ISOBUS network, etc.) includes a pump for pumping fluid from a storage tank(s) 1290 to application units 1280, 1281, . . . N of the implement, a soil apparatus 1256 (e.g., 290, 400, 500, 600, 700, 800) for sensing soil and seed characteristics, sensors 1252 (e.g., speed sensors, seed sensors for detecting passage of seed, sensors for detecting characteristics of soil or a trench including soil moisture, soil organic matter, soil temperature, seed presence, seed spacing, percentage of seeds firmed, and soil residue presence, downforce sensors, actuator valves, moisture sensors or flow sensors for a combine, speed sensors for the machine, seed force sensors for a planter, fluid application sensors for a sprayer, or vacuum, lift, lower sensors for an implement, flow sensors, etc.), controllers 1254 (e.g., GPS receiver), and the processing system 1262 for controlling and monitoring operations of the implement. The pump controls and monitors the application of the fluid to crops or soil as applied by the implement. The fluid application can be applied at any stage of crop development including within a planting trench upon planting of seeds, adjacent to a planting trench in a separate trench, or in a region that is nearby to the planting region (e.g., between rows of corn or soybeans) having seeds or crop growth.

For example, the controllers may include processors in communication with a plurality of seed sensors. The processors are configured to process data (e.g., fluid application data, seed sensor data, soil data, furrow or trench data) and transmit processed data to the processing system 1262 or 1220. The controllers and sensors may be used for monitoring motors and drives on a planter including a variable rate drive system for changing plant populations. The controllers and sensors may also provide swath control to shut off individual rows or sections of the planter. The sensors and controllers may sense changes in an electric motor that controls each row of a planter individually. These sensors and controllers may sense seed delivery speeds in a seed tube for each row of a planter.

The network interface 1260 can be a GPS transceiver, a WLAN transceiver (e.g., WiFi), an infrared transceiver, a Bluetooth transceiver, Ethernet, or other interfaces from communications with other devices and systems including the machine 1202. The network interface 1260 may be integrated with the implement network 1250 or separate from the implement network 1250 as illustrated in FIG. 12.

The processing system 1262 communicates bi-directionally with the implement network 1250, network interface 1260, and I/O ports 1266 via communication links 1241-1243, respectively.

The implement communicates with the machine via wired and possibly also wireless bi-directional communications 1204. The implement network 1250 may communicate directly with the machine network 1210 or via the networks interfaces 1215 and 1260. The implement may also by physically coupled to the machine for agricultural operations (e.g., planting, harvesting, spraying, etc.).

The memory 1205 may be a machine-accessible non-transitory medium on which is stored one or more sets of instructions (e.g., software 1206) embodying any one or more of the methodologies or functions described herein. The software 1206 may also reside, completely or at least partially, within the memory 1205 and/or within the processing system 1220 during execution thereof by the system 1200, the memory and the processing system also constituting machine-accessible storage media. The software 1206 may further be transmitted or received over a network via the network interface 1215.

In one embodiment, a machine-accessible non-transitory medium (e.g., memory 1205) contains executable computer program instructions which when executed by a data processing system cause the system to performs operations or methods of the present disclosure. While the machine-accessible non-transitory medium (e.g., memory 1205) is shown in an exemplary embodiment to be a single medium, the term "machine-accessible non-transitory medium" should be taken to include a single medium or multiple media (e.g., a centralized or distributed database, and/or associated caches and servers) that store the one or more sets of instructions. The term "machine-accessible non-transitory medium" shall also be taken to include any medium that is capable of storing, encoding or carrying a set of instructions for execution by the machine and that cause the machine to perform any one or more of the methodologies of the present disclosure. The term "machine-accessible non-transitory medium" shall accordingly be taken to include, but not be limited to, solid-state memories, optical and magnetic media, and carrier wave signals.

Any of the following examples can be combined into a single embodiment or these examples can be separate embodiments. In one example of a first embodiment, a soil apparatus comprises a soil engaging portion to engage with soil; and a plurality of sensors disposed in the soil apparatus. Each sensor is independently pivotable to independently position for sensing soil characteristics of soil.

In one example of a second embodiment, a soil apparatus comprises a curved portion to engage with soil and displace soil; and a plurality of sensors disposed in the soil apparatus. Each sensor has a different depth for sensing soil characteristics of soil.

What is claimed is:

1. A soil apparatus comprising:

a soil engaging portion to engage with soil; and a plurality of sensors disposed in the soil apparatus of a row unit and having a pivotable axis within the soil apparatus, wherein each sensor of the plurality of sensors is independently pivotable about the pivotable axis to independently position for sensing soil characteristics of soil, and wherein each sensor of the plurality of sensors is positioned vertically along the pivotable axis with respect to each of the plurality of sensors.

2. The soil apparatus of claim 1, wherein each sensor is configured to sense soil characteristics when the soil engaging portion of the soil apparatus engages in soil of an agricultural field.

3. The soil apparatus of claim 1, wherein the soil apparatus comprises a knife to engage in soil of an agricultural field or cut a trench in the soil.

4. The soil apparatus of claim 2, wherein at least one sensor for detecting characteristics of soil or a trench including at least one of soil moisture, soil organic matter, soil temperature, seed presence, seed spacing, percentage of seeds firmed, and soil residue presence.

5. The soil apparatus of claim 1, wherein at least one sensor includes a first window disposed along a first side of the at least one sensor.

6. The soil apparatus of claim 5, wherein at least one sensor includes a second window disposed along a second side of the at least one sensor.

7. The soil apparatus of claim 6, wherein each sensor of the plurality of sensors includes the first window disposed along the first side of the sensor and a each sensor of the plurality of sensors includes the second window disposed along the second side of the sensor.

8. The soil apparatus of claim 7, wherein each sensor has a different depth with respect to a soil level.

9. The soil apparatus of claim 1, wherein the plurality of sensors comprise one or more reflectivity, capacitive moisture, electronic tensiometer, temperature, or electrical conductivity sensors.

* * * * *